US006359866B1

(12) United States Patent
Svensson et al.

(10) Patent No.: US 6,359,866 B1
(45) Date of Patent: Mar. 19, 2002

(54) BASE STATION HAVING TRANSCEIVERS USED FOR COMMUNICATING VOICE AND PACKET DATA SIGNALS

(75) Inventors: Håkan Svensson, Lunna; Lennart Allinger, Göteborg, both of (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 08/768,121

(22) Filed: Dec. 17, 1996

(51) Int. Cl.[7] ................................................. H04Q 7/00
(52) U.S. Cl. ........................ 370/331; 370/353; 455/553; 455/560
(58) Field of Search ................................ 370/328, 331, 370/352, 353, 354; 455/527, 553, 560, 561

(56) References Cited

U.S. PATENT DOCUMENTS

| 4,654,867 | A | * | 3/1987 | Labedz et al. | 455/438 |
|---|---|---|---|---|---|
| 4,831,373 | A |   | 5/1989 | Hess | |
| 4,887,265 | A |   | 12/1989 | Felix | |
| 4,916,691 | A |   | 4/1990 | Goodman | |
| 4,955,083 | A | * | 9/1990 | Phillips et al. | 455/47 |
| 5,175,867 | A |   | 12/1992 | Wejke et al. | |
| 5,228,074 | A | * | 7/1993 | Mazikovsky | 455/553 |
| 5,235,598 | A | * | 8/1993 | Sasuta | 370/327 |
| 5,293,380 | A |   | 3/1994 | Kondo | |
| 5,521,925 | A | * | 5/1996 | Merakos et al. | 370/337 |
| 5,533,019 | A |   | 7/1996 | Jayapalan | |
| 5,544,222 | A | * | 8/1996 | Robinson et al. | 455/557 |
| 5,574,966 | A | * | 11/1996 | Barzegar et al. | 455/601 |
| 5,668,804 | A | * | 9/1997 | Suonvieri | 370/331 |
| 5,675,629 | A | * | 10/1997 | Raffel et al. | 455/552 |
| 5,737,706 | A | * | 4/1998 | Seazholtz et al. | 455/466 |
| 5,752,193 | A | * | 5/1998 | Scholefield et al. | 455/452 |
| 5,778,318 | A | * | 7/1998 | Talarmo et al. | 455/452 |
| 5,793,757 | A | * | 8/1998 | Uddenfeldt | 370/335 |
| 5,793,843 | A | * | 8/1998 | Morris | 455/422 |

FOREIGN PATENT DOCUMENTS

| EP | 615 393 | 9/1994 |
|---|---|---|
| GB | 2294610 | 5/1996 |
| WO | WO 97 22216 | 6/1997 |

OTHER PUBLICATIONS

K. Felix, "Packet Switching in Digital Cellular Systems", *Proc. 38th IEEE Vehicular Technology Conf*, pp. 414–418, Jun. 1988.

P. Decker et la., "A General Packet Radio Service Proposed for GSM", *GSM in a Future Competitive Environment*, Helsinki, Finland, pp. 1–20, Oct. 13, 1993.

P. Decker, "Packet Radio GSM", *European Telecommunications Standards Institute (ETSI)*, T Doc SMG 4 58/93, pp. 1–3 (odd pages only), Feb. 12, 1993.

J. Håmååinen et al., "Packet Data Over GSM Network", T Doc SMG 1 238/93, *ETSI*, pp. 1–8, Sep. 28, 1993.

* cited by examiner

*Primary Examiner*—David R. Vincent
*Assistant Examiner*—Bob A. Phunkula
(74) *Attorney, Agent, or Firm*—Burns, Doane, Swecker & Mathis, L.L.P.

(57) ABSTRACT

A method and apparatus for providing support for voice communications and data communications at a base station which has a plurality of transceivers, each having a voice mode of operation and a data mode of operation, is disclosed. A first voice call is assigned to a first transceiver, wherein the mode of the transceiver is set to the voice mode of operation. A data transmission is assigned to a second available transceiver, wherein the mode of the transceiver is set to the data mode of operation. The data transmission is halted when a second voice call needs to be handled by the second transceiver. The mode of operation of the second transceiver is changed from the data mode to the voice mode and the second call is initiated. The data transmission is then assigned to the next available transceiver as long as a voice call does not need to be carried, wherein the mode of the transceiver is set to the data mode of operation.

6 Claims, 3 Drawing Sheets

BASE STATION HAVING TRANSCEIVERS USED FOR COMMUNICATING VOICE AND PACKET DATA SIGNALS

FIELD OF THE INVENTION

The present invention relates to a method and apparatus for providing voice and data communication in a communications system, and particularly for providing voice and data communication using the same transceivers in a base station.

BACKGROUND OF THE INVENTION

Packet switch technology, which may be connection oriented (e.g., X.25) or "connectionless" (e.g., the Internet protocol "IP"), does not require the set up and tear down of a physical connection, which is in marked contrast to circuit switch technology. This reduces the data latency and increases the efficiency of a channel in handling relatively short, bursty, or interactive transactions. A connectionless packet switch network distributes the routing functions to multiple routing sites, thereby avoiding possible traffic bottlenecks which could occur when using a central switching hub. Data is "packetized" with the appropriate end-system addressing and then transmitted in independent units along the data path. Intermediate systems, sometimes called "routers," stationed between the communicating end-systems make decisions about the most appropriate route to take on a per packet basis. Routing decisions are based on a number of characteristics, including: least cost route or cost metric; capacity of the link; number of packets waiting for transmission; security requirements for the link; and intermediate system (node) operation status.

Packet transmission along a route that takes into consideration path matrics as opposed to a single circuit set-up, offers application and communication flexibility. It is also how most standard local area networks (LANs) and wide area networks (WANs) have evolved in the corporate environment. Packet switching is appropriate for data communications because many of the applications and devices used, such as keyboard terminals, are interactive and transmit data in bursts. Instead of a channel being idle while a user inputs more data into the terminal or pauses to think about a problem, packet switching interleaves multiple transmissions from several terminals onto the channel. Packet data provides more network robustness due to path independence and the routers ability to select alternative paths in the event of network node failure. Packet switching, therefore, allows for more efficient use of the network lines. Packet technology offers the option of billing the end user based on amount of data transmitted instead of connection time. If the end user's application has been designated to make efficient use of the air link, the number of packets transmitted will be minimal. If each individual user's traffic is held to a minimum, then the service provider has effectively increased network capacity.

Packet networks are usually designed and based on industry wide data standards, such as the open system interface (OSI) model or the TCP/IP protocol stack. The standards have been developed, whether formally or defacto for many years, and the applications that use these protocols are readily available. The main objective of standards-based networks is to achieve interconnectivity with other networks. The Internet is todays most obvious example of such a standards-based network pursuant of this goal.

Packet networks, like the Internet, or a corporate LAN, are integral parts of todays business communications environments. As mobile computing becomes pervasive in these environments, wireless service providers such as those using TIA/EIA/IS-136 are best positioned to provide access to these networks. Nevertheless, the data services provided by or proposed for cellular systems are generally based on the circuit switched mode of operation, using a dedicated radio channel for each active mobile user.

A few exceptions to data services for cellular systems is based on the circuit switched mode of operation are described in the following documents, which include the packet data concepts.

U.S. Pat. No. 4,887,265 and "Packet Switching in Digital Cellular Systems," Proc. 38 IEEE Vehicular Technology Conference, pp. 414–418 (June 1988) describe a cellular system providing shared packet data radio channels, each one capable of accommodating multiple data transmissions. A mobile station requesting packet data service is assigned to a particular data packet channel using essentially regular cellular signalling. The system may include packet access points (PAPs) for interfacing with packet data networks. Each packet data radio channel is connected to one particular PAP and is thus capable of multiplexing data transmissions associated with that PAP. Handovers are initiated by the system in a manner that is largely similar to the handover used in the same system for voice channels. A new type of handover is added for those situations when the capacity of a packet channel is insufficient.

These documents are data transmission oriented and based on using system initiated handover in a similar way as for regular voice calls. Applying these principles for providing general purpose packet data services in a TDMA cellular system would result in spectrum inefficiency and performance disadvantages.

U.S. Pat. No. 4,916,691 describes a new packet mode cellular radio system architecture and a new procedure for routing (voice and/or data) packets to a mobile station. Based stations, public switches via trunk interface units, and a cellular control unit are linked together via a WAN. The routing procedure is based on the mobile station initiated handovers and on adding to the header of any packet transmitted from a mobile station (during a call) an identifier of the base station through which the packet passes. In the case of an extended period of time between subsequent user information packets from a mobile station, the mobile station may transmit extra control packets for the purpose of conveying cell location information.

The cellular control unit is primarily involved at call establishment, and it assigns to the call a call control number. It then notifies the mobile station of the call control number and the trunk interface unit of the call control number and the identifier of the initial base station. During a call, packets are then routed directly between the trunk interface unit and the currently serving base station.

The system described in U.S. Pat. No. 4,916,691 is not directly related to the specific problems of provided packet data services in TDMA cellular systems.

"Packet Radio in GSM," European Telecommunications Standards Institute (ETSI) T DOC SMG 4 58/93 (Feb. 12, 1993) and "A General Packet Radio Service Proposed for GSM, " presented during a seminar entitled "GSM in a Future Competitive Environment," Helsinki, Finland (Oct. 13, 1993) outline a possible packet access protocol for voice and data in GSM. These documents directly relate to TDMA cellular systems, i.e., GSM, and although they outline a possible organization of an optimized shared packet data channel, they do not deal with the aspects of integrating packet data channels in a total system solution.

"Packet Data over GSM Network," T DOC SMG 1 238/93, ETSI (Sep. 28, 1993) describes a concept of providing packet data service in GSM based on first using regular GSM signalling and authentication to establish a virtual channel between a packet mobile station and an agent handling access to packet data services. With regular signalling modified for fast control set-up and release, regular traffic channels are then used for packet transfer. This document directly relates to TDMA cellular systems, but since the concept is based on using a "fast switching" version of existing GSM traffic channels, it has disadvantages in terms of spectrum efficiency and packet transfer delays (especially for short messages) compared to a concept based on optimized shared packet data channels.

Cellular digital packet data (CDPD) Systems Specification Release 1.0, July, 1993, which is expressly incorporated herein by reference, describes a concept for providing packet data services that utilize available radio channels on current advanced mobile phone service (AMPS) systems, i.e., the North American Analog Cellular System. CDPD is a comprehensive, open specification endorsed by a group of U.S. cellular operators. Items covered include external interfaces, air link interfaces, services, network architecture, network management, and administration. The specified CDPD system is to a large extent based on an infrastructure which is independent of the existing AMPS infrastructure. Commonalities with AMPS systems are limited to utilization of the same type of radio frequency channels and the same base station sites (the base station used by CDPD may be new and CDPD specific) and employment of a signalling interface for coordinating channel assignments between the two systems.

As stated above, a CDPD based radio station is placed beside the AMPS base station. The two base stations use the same antennas. The CDPD transceivers get information from the AMPS system on idle radio frequency channels and tunes its transceivers to those channels. If an RF channel currently used by CDPD is assigned to a cellular phone call, this is detected by the CDPD base station. The CDPD transceiver ramps down its output power and tunes to a new idle RF channel and resumes its transmissions.

One of the problems with the current solution is that it requires extra transceivers to be able to use CDPD at an AMPS site. One extra transceiver is required for each simultaneous CDPD channel required. If, for example, three simultaneous CDPD channels are required at a site, three extra transceivers are required at that base station. Since the CDPD transceivers continuously change radio channels, cavity combiners cannot be used. Currently alternatives are to use a duplex filter and send CDPD on the AMPS receiver antennas or to use hybrid combiners. Duplex filters degrade the received performance of the AMPS base station while hybrid combiners have problems with high output power. Thus, there is a need for a method and apparatus for providing CDPD support in a wireless communication system which overcomes all of the problems cited above.

SUMMARY OF THE INVENTION

It is an object of the present invention to overcome the problems cited above with the prior art by providing a method and apparatus so as to allow a CDPD base station to use the transceivers of a cellular mobile radio telephone system to transmit data. The CDPD base station can be designed to take advantage of the cellular system transceivers. When a voice channel goes idle, the transceiver changes mode from voice to packet data on the same radio frequency channel. As a result, no tuning of cavity combiners is required. When the cellular system requires the transceiver again, it will change back to the voice mode. This implies that the CDPD system will use different transceivers for each of these hops. This mode switch of the transceiver can be done within a few milliseconds as required by the CDPD system. The solution can be further enhanced by changing the channel selection algorithm from the cellular system to, preferably, select channels not used by the CDPD system.

According to one embodiment of the present invention, a method for providing support for voice communications and data communications at a base station which has a plurality of transceivers, each having a voice mode of operation and a data mode of operation, is disclosed. A first voice call is assigned to a first transceiver, wherein the mode of the transceiver is set to the voice mode of operation. A data transmission is assigned to a second available transceiver, wherein the mode of the transceiver is set to the data mode of operation. The data transmission is halted when a second voice call needs to be handled by the second transceiver. The mode of operation of the second transceiver is changed from the data mode to the voice mode and the second call is initiated. The data transmission is then assigned to the next available transceiver as long as a voice call does not need to be carried, wherein the mode of the transceiver is set to the data mode of operation.

According to another embodiment of the present invention, a method for providing support for voice communications and data communications at a base station which has a plurality of transceivers, all of said transceivers having a voice mode of operation and a subset of the plurality of transceivers also having a data mode of operation, is disclosed. A first voice call is assigned to a first transceiver, wherein the mode of the transceiver is set to the voice mode of operation. A second voice call is assigned to an available transceiver in said subset of transceivers when the transceivers outside said subset are not available. An intra-cell handover of the second voice call handled by a transceiver in said subset of transceivers is performed to a transceiver outside said subset when the transceiver becomes available so as to make the transceiver in the subset available for a data transmission.

BRIEF DESCRIPTION OF THE DRAWINGS

These and other features, objects, and advantages of the present invention will become more readily apparent to one skilled in the art by reading the following detailed description in conjunction with the appended figures in which.

DETAILED DESCRIPTION

The present invention will now be described with reference to the AMPS communications system. However, it will be understood by one skilled in the art that the present invention also applies to other communication systems and is not limited to the AMPS communication system.

Figure 1:
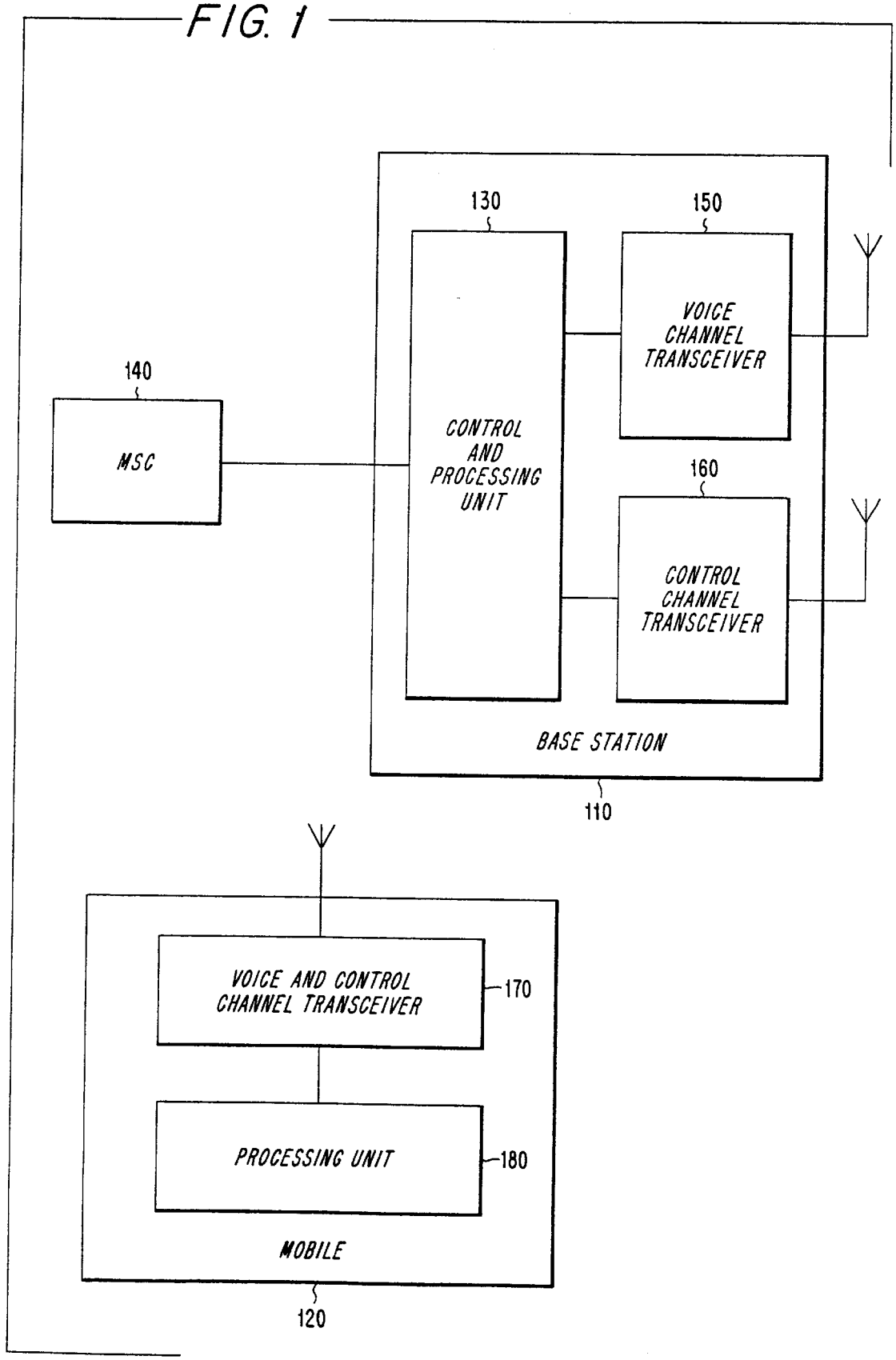
FIG. 1 illustrates part of a cellular system layout.

FIG. 1 illustrates a part of a cellular mobile radio telephone system. The cellular mobile radio telephone system includes an exemplary base station 110 and a mobile station or remote station 120. It will be understood that a typical cellular system comprises a plurality of base stations and a plurality of mobile stations, but for the sake of simplicity FIG. 1 only illustrates one base station and one mobile station. The base station includes a control and processing unit 130 which is connected to the mobile switching center (MSC) 140 which in turn is connected to the public switch telephone network (PSTN). General aspects of such a cellular radio telephone system are known in the art, as described by U.S. Pat. No. 5,175,867 to Wejke et al., which is incorporated herein by reference.

The base station 110 handles a plurality of voice channels through a voice channel transceiver 150, which is controlled by the control and processing unit 130. It should be noted that each base station may have more than one transceiver. Also, each base station includes a control channel transceiver 160, which may be capable of handling more than one control channel. The control channel transceiver 160 is controlled by the control and processing unit 130. The control channel transceiver 160 broadcasts control information over the control channel of the base station to mobiles locked to that control channel. It will be understood that the transceivers 150 and 160 can be implemented as a single device, like the voice control transceiver 170 in the mobile station, for use with the Digital Control Channel (DCCH) and the Digital Traffic Channel (DTC) that share the same radio carrier frequency. Likewise, each base station may be outfitted with a plurality of voice and control transceivers.

During operation, the mobile stations will be in contact with the fixed part of the system by transmission of radio signals to, and reception of radio signals from different base stations. Telephone calls, data communication links, or other communication paths can be set-up between one mobile station and another mobile station in the system. Calls can also be set-up to mobiles in another system for subscribers in the fixed network. For the purposes of this discussion, all of these situations are called connections irrespective of whether they originate in a mobile station or end in a mobile station.

Figure 2:
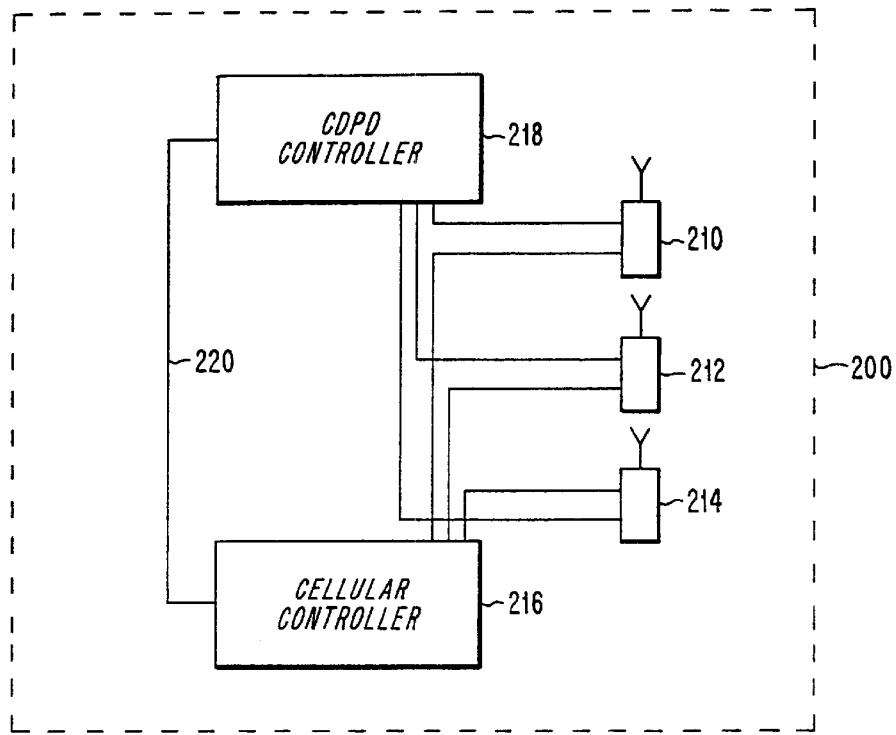
FIG. 2 illustrates a base station layout according to a first embodiment of the present invention.

According to the present invention, CDPD equipment is situated at each base station of the cellular communication system to provide packet data communication support. Unlike prior systems, the CDPD system uses the same transceivers as the cellular communication system. FIG. 2 illustrates a base station according to one embodiment of the present invention. It will be understood by one of ordinary skill in the art that the base station can have any number of transceivers but the present invention will be explained with reference to three transceivers but is not limited thereto. The base station 200 contains a plurality of transceivers, for example, three, as illustrated in FIG. 2. The transceivers 210, 212, 214 are connected to a cellular controller 216 which controls the transmission and reception of voice information at the base station. The transceivers 210, 212, 214 are also connected to the CDPD controller 218 which controls the data communications to and from the base station 200. Typically, the cellular controller 216 can be implemented by several computer boards mounted in the base station, wherein each board controls several transceivers, but the present invention is not limited thereto. Typically, the CDPD controller 218 can be implemented by a computer board mounted in the base station, wherein the computer board controls all of the CDPD transceivers, but the present invention is not limited thereto. It should be noted that the actual decision to assign a channel (transceiver) to a voice call or data transmission is made by the mobile switching center. The command is then sent to the base station and is acted upon by either the cellular controller or the CDPD controller.

A control line 220 connects the CDPD controller 218 and the cellular controller 216 so as to allow the two controllers to communicate. According to one embodiment of the present invention, all of the transceivers 210, 212, 214, can be switched back and forth between a voice mode and a packet data mode. When a transceiver is not being used for a voice call, it can be used for a packet data transmission. However, according to the present invention, there is no need to tune any of the transceivers to the channels. The packet data mode of the base station is typically connectionless. This means that there are no data transmissions assigned to a channel/transceiver. Several mobile end systems can use a single packet channel. The mobile end systems compete for each burst to send at least one data packet. The packet transceiver is continually transmitting while in the packet data mode whether there is data to transmit or not.

As noted above, the cellular controller sends messages to the CDPD controller when a transceiver is available or is required. The controller that takes over a transceiver can then send a signal to the transceiver ordering the transceiver to change modes. The mode change in the transceiver is made by changing the path of execution in the transceiver which changes at least the modulation, channel coding and access method within the transceiver.

Figure 3:
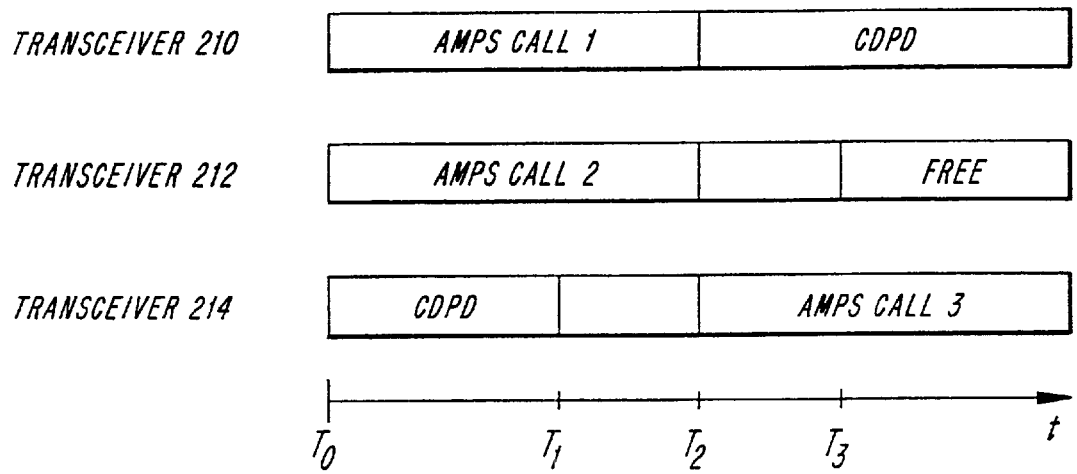
FIG. 3 illustrates a timing diagram according to the first embodiment of the present invention.

The present invention will now be further explained with reference to FIG. 3 which shows a timing chart of the operation of three transceivers 210, 212, 214. Before time $T_0$, it is assumed that the transceivers 210 and 212 are in the process of handling voice calls 1 and 2 for the cellular system. In addition, the transceiver 214 is not being used for a voice call. At time $T_0$, the packet data system needs to send information. Since the transceiver 214 is available, the CDPD controller 218 signals the cellular controller 216 over the line 220 that the CDPD system is going to use the transceiver 214. The CDPD controller 218 then checks the mode of the transceiver 214 and changes the mode of operation to the CDPD mode if the transceiver is in the cellular mode. The CDPD controller 218 then begins sending packet data to a mobile station (not illustrated) using the transceiver 214. The packet data information is transmitted until all of the packet data information has been transmitted or until the cellular system needs to make a call. At time $T_1$, the cellular system needs to make a third call using the transceiver 214. The cellular controller 216 signals the CDPD controller 218 that the transceiver 214 is needed for a voice call. The CDPD controller 218 then stops sending data over the transceiver 218. The cellular controller 216 then switches the mode of the transceiver to the cellular mode and initiates the voice call. The mode switch of the transceiver can be done within a few milliseconds as required by the CDPD system. At time $T_2$, call 1 on the cellular system ends thus freeing transceiver 210. The packet data system can then use the transceiver 210 to continue sending the packet data information by changing the mode of the transceiver 210 to the CDPD mode.

For various reasons such as cost and complexity, a communications provider may not want to share all of the transceivers of the cellular system with the CDPD system. In this case, since the CDPD system will only be supported by a subset of the total number of transceivers, there is a need for a method for maximizing the availability of the transceivers which support the CDPD system. The present invention solves this need by using intra-cell handover in the cellular system. Intracell handover is the handoff of a call from one voice channel to another voice channel within the same base station. Typically, intra-cell handover is based on quality measurements from the mobile station and the base station. Intra-cell handover is used, for example, to avoid channels with strong interferers. In the present invention, intra-cell handover can be used to handoff a voice call from one transceiver which supports both voice calls and packet data transmissions to another transceiver which only supports voice calls at the same base station, thus freeing the transceiver to handle packet data transmissions.

Figure 4:
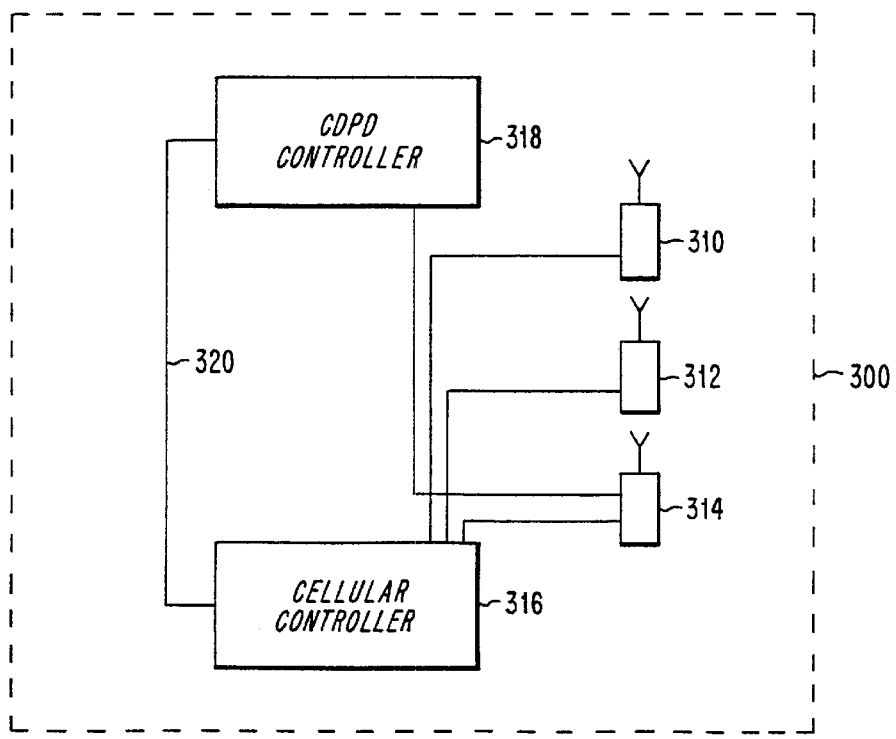
FIG. 4 illustrates a base station layout according to a second embodiment of the present invention.

FIG. 4 illustrates a base station 300 according to the second embodiment of the present invention. As in FIG. 2, the cellular controller 316 is connected to transceivers 310, 312, 314. However, in this embodiment, the CDPD controller 318 is only connected to the transceiver 314. As will be explained below, intra-cell handovers can be used to handoff voice calls from the transceiver 314 to either of the other transceivers when they are available, thereby freeing the transceiver 314 so that it can be used by the CDPD system.

Figure 5:
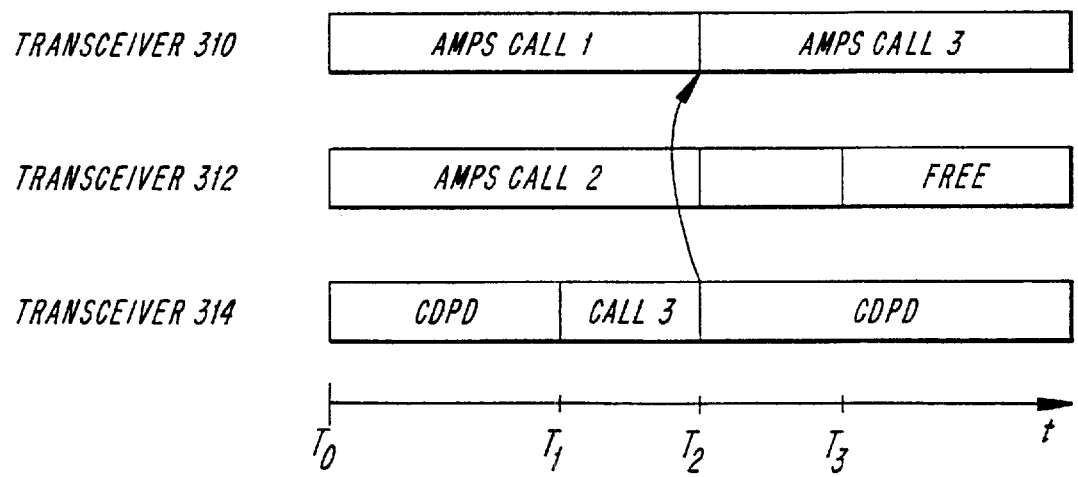
FIG. 5 illustrates another timing diagram according to the second embodiment of the present invention.

FIG. 5 shows a timing chart of the operations of the three transceivers 310, 312, 314. Before time $T_0$, it is assumed that transceivers 310 and 312 are in the process of handling voice calls 1 and 2 for the cellular system. In addition, the transceiver 314 is not being used for a voice call. At time $T_0$, the packet data system needs to send information. Since the transceiver 314 is available, the CDPD controller 318 signals the cellular controller 316 over the signal line 320 that the CDPD system is going to use the transceiver 314. The CDPD controller 318 then checks the mode of the transceiver 314 and changes the mode of operation to the CDPD mode if the transceiver is in the cellular mode. The CDPD controller 318 then begins sending packet data to a mobile station (not illustrated) using the transceiver 314. The packet data information is transmitted until all of the packet data information has been transmitted or until the cellular system needs to set up a call. At time $T_1$, the cellular system needs to make a third call using the transceiver 314. The cellular controller 316 signals the CDPD controller 318 that the transceiver 314 is needed for a voice call. The CDPD controller 318 then stops sending data over the transceiver 314. The cellular controller 316 then switches the mode of the transceiver to the voice mode and initiates the voice call. At time $T_2$, the call 1 ends on transceiver 310. Using intra-cell handover, voice call 3 on transceiver 314 can be moved to the available transceiver 310. Once voice call 3 has been switched, the CDPD controller 318 can change the mode of the transceiver 314 to the CDPD mode and can then continue transmitting the packet data information.

It will be appreciated by those of ordinary skill in the art that the present invention can be embodied in other specific forms without departing from the spirit or central character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

What is claimed is:

1. A base station which supports voice communications and packet data communications, comprising:
 a plurality of transceivers for transmitting and receiving voice and packet data signals from a plurality of remote stations, wherein each transceiver has a voice mode of operation for communicating voice signals and a subset of the plurality of transceivers also have a packet data mode of operation for communicating packet data signals using a connectionless protocol;
 voice control means connected to each of said plurality of transceivers for controlling the transmission and reception of voice communications at the base station;
 packet data control means connected to said subset of said plurality of transceivers for controlling the transmission and reception of packet data signals at the base station;
 means for switching between said voice and packet data modes such that each transceiver operates in the packet data mode only when it is not needed to operate in the voice mode;
 means for performing an intra-cell handover of a voice call being handled by a transceiver in said subset of transceivers to one of the transceivers not in the subset when the transceiver outside the subset of transceivers becomes available so as to free the transceiver in the subset to handle packet data communications.

2. A base station according to claim 1, wherein a transceiver operating in the packet data mode is switched to the voice mode regardless of whether a packet data communication has been completed.

3. A method for providing support for voice communications and data communications at a base station which has a plurality of transceivers, all of said transceivers having a voice mode of operation and a subset of the plurality of transceivers also having a packet data mode of operation, comprising the steps of;
 assigning a first voice call to a first transceiver, wherein the mode of the transceiver is set to the voice mode of operation;
 assigning a second voice call to an available transceiver in said subset of transceivers when the transceivers outside said subset are not available;
 performing an intra-cell handover of the second voice call handled by a transceiver in said subset of transceivers to a transceiver outside said subset when the transceiver becomes available so as to make the transceiver in the subset available for a packet data transmission using a connectionless protocol.

4. A wireless communication system which supports voice communications and packet data communications to a plurality of remote stations, comprising:
 at least one mobile switching center for controlling the operation of the wireless communication system; and
 at least one base station operating under the control of the mobile switching center including:
 a plurality of transceivers for transmitting and receiving voice and packet data signals from a plurality of remote stations, wherein each transceiver has a voice mode of operation for communicating voice signals and a subset of the plurality of transceivers also have a packet data mode of operation for communicating packet data signals using a connectionless protocol;
 voice control means connected to each of said plurality of transceivers for controlling the transmission and reception of voice signals at the base station;
 packet data control means connected to said subset of said plurality of transceivers for controlling the transmission and reception of packet data signals at the base station;
 means for switching between said operational modes of the transceivers in response to transceiver mode switch commands received from said mobile switching center such that each transceiver operates in the packet data mode only when it is not needed to operate in the voice mode;

means for performing an intra-cell handover of a voice call being handled by a transceiver in said subset of transceivers to one of the transceivers not in the subset when the transceiver outside the subset of transceivers becomes available so as to free the transceiver in the subset to handle packet data communications.

5. A wireless communication system according to claim 4, wherein said at least one mobile switching center sends transceiver mode switch commands to said at least one base station instructing the base station to change modes of the transceivers.

6. A wireless communication system according to claim 4, wherein a transceiver operating in the packet data mode is switched to the voice mode regardless of whether packet data communication has been completed.

* * * * *